Sept. 24, 1957　　　J. E. PARKER ET AL　　　2,807,432
MEANS OF FASTENING FLEXIBLE TUBING TO A DUCT COLLAR
Filed Dec. 8, 1955　　　2 Sheets-Sheet 1
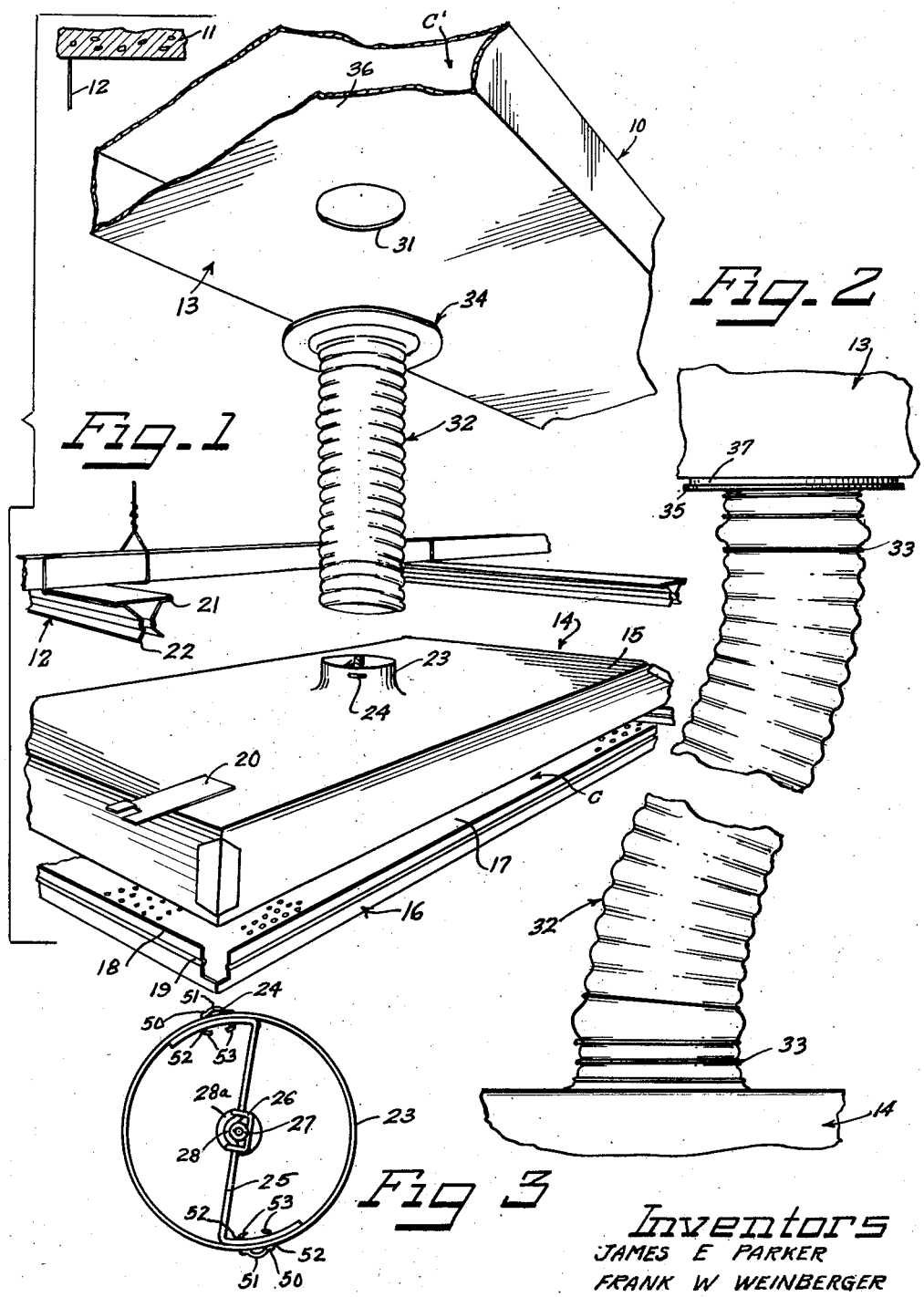
Inventors
JAMES E PARKER
FRANK W WEINBERGER
By Hill, Sherman, Meroni, Gross & Simpson Atty's

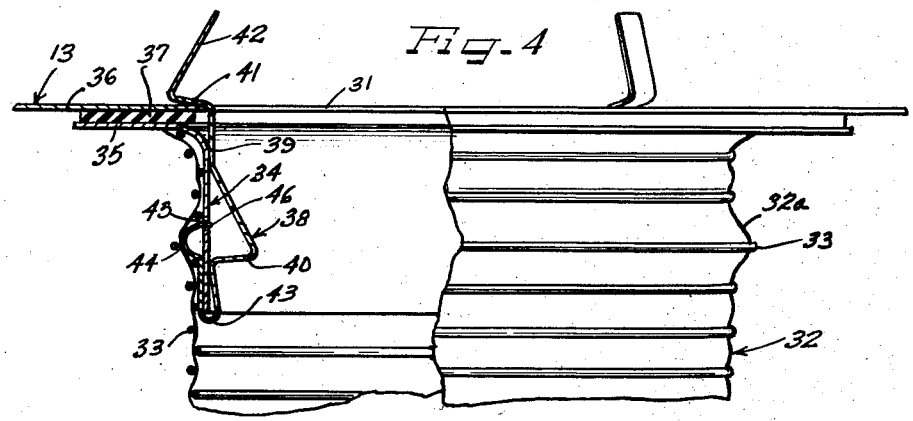
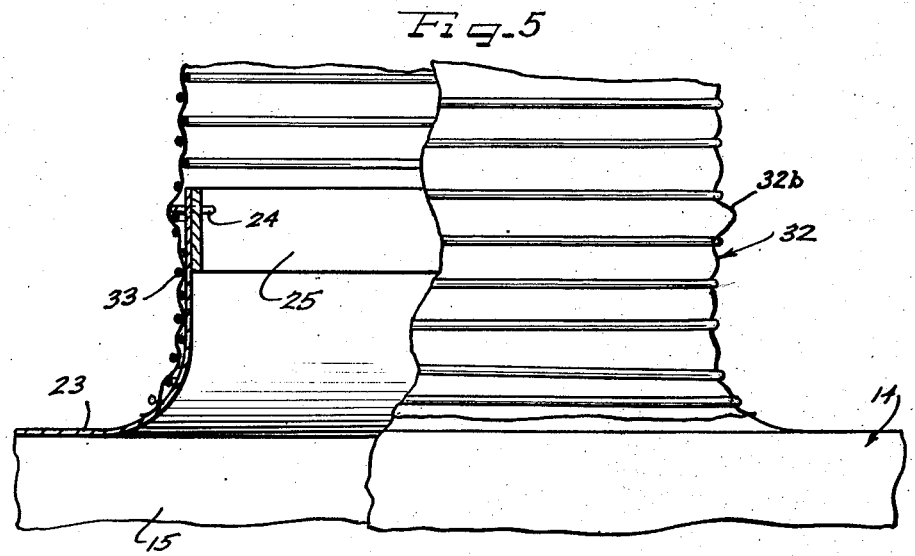
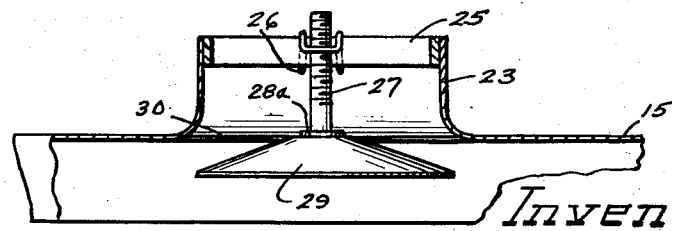

United States Patent Office 2,807,432
Patented Sept. 24, 1957

2,807,432

MEANS OF FASTENING FLEXIBLE TUBING TO A DUCT COLLAR

James E. Parker, Des Plaines, and Frank W. Weinberger, Wheeling Township, Ill., assignors to The Pyle-National Company, Chicago, Ill., a corporation of New Jersey Application December 8, 1955, Serial No. 551,859

3 Claims. (Cl. 251—150)

This invention relates generally to a method and means of fastening flexible tubing to a duct collar or the like and may be used in a ventilating system or the like.

More specifically, this invention relates to a flexible tube construction having our novel fastening means at opposite ends whereby one end of the flexible tube may be fastened to a collar on an air diffuser and the other end to a collar cut out of a main ventilating duct or the like all to the end of aiding in the simple assembly of the component elements.

In the operation of the instant ventilating system, fluid at a given pressure is forced through the main duct. At predetermined intervals, openings are provided to which a flexible tube and diffuser assembly may be readily detachably connected with each of the openings thereby allowing the air to funnel and enter the low pressure diffuser which may constitute a plenum chamber.

According to the general features of the invention there is provided a flexible tube having opposite ends which may be preferably threaded over resilient protuberances or abutments provided on tubular collars whereby the collars may be threaded together with the ends of the tube.

Another feature of this invention relates to a novel clip and collar construction whereby the clip not only provides means for attaching same with an end of a tube but in addition provides means by which the clip, collar and tube assembly may be detachably connected to an adjacent member or an air distributing duct.

It is an object of this invention to provide an improved ventilating apparatus which may be used in a ceiling or side wall of a room.

A further object of this invention is to provide an improved ventilating apparatus operable on a pressure-displacement principle.

Still another object of this invention is to provide an extremely economical fastening means to connect a flexible tube to a collar without the necessity of precision machining either the tube or the collar.

Yet another object of this invention is to provide a new and improved method of assembling the components of a fluid distributing system.

Still another object of this invention is to provide a new and improved ventilating system wherein the components may be economically manufactured and assembled together with a minimum of cost.

Many other advantages, features and additional objects of the present invention will become manifest to those versed in the art upon making reference to the detailed description which follows and the accompanying sheets of drawings in which a preferred structural embodiment incorporating the principles of the present invention is shown by way of illustrative example only.

Figure 1 is a fragmentary exploded view of a number of the components in our ventilating system;

Figure 2 is an enlarged fragmentary elevation of a portion of the system shown in Figure 1;

Figure 3 is a plan view of the lower collar shown in Figure 1 with a flow control valve mounted therein;

Figure 4 is an enlarged fragmentary side elevation, partially shown in section, of a portion of the structure shown in Figure 1 in accordance with the principles of the present invention;

Figure 5 is an enlarged fragmentary side elevation, partially shown in section, of another portion of the structure shown in Figure 1 in accordance with the principles of the present invention; and Figure 6 is an enlarged cross sectional view with parts in elevation showing the operation of the valve.

As shown on the drawings:

A particularly useful application of the principles of the present invention is made in connection with the method and means of fastening flexible tubing to a duct collar in a ceiling type ventilating apparatus although it will be understood that the ventilating apparatus can be advantageously employed with any wall surface of an enclosure or space to be ventilated. Furthermore, it will be understood that our method and means of fastening flexible tubing to a duct collar has other uses and applications apparent to those versed in this art.

The reference numeral 10 indicates generally our air distributing system which has been illustrated in the drawings and particularly Figure 1 as a ceiling type system. It will be noted that a concrete superstructure 11 (only partially illustrated) has been shown and is representative of a typical wall construction used in modern buildings. Extending vertically from the concrete superstructure are guy wires 12 which are adapted to sustain ceiling support structure comprising T runners or light weight cross rods 12. Suitably suspended intermediate the concrete superstructure and the rods 12 is a sheet metal conduit or air distributor 13 of the type adapted to carry air or other pressurized fluid from a main pumping station to various parts of the building or the like in which the system 10 is to be used.

The cross rods 12 are particularly constructed to be capable of sustaining a false ceiling thereon. In one well known form of false ceiling construction, a plurality of acoustic tiles or a plurality of perforated metal pans are clipped in detachable assembly to the cross rods 12, thereby providing a continuous inner wall spaced interiorly of the concrete 11. The ventilating system of the present invention can be employed in combination with such a surface to locate a plurality of air distributor outlets in spaced apart relation thereby to diffuse ventilating air through the space being ventilated. Although the principles of the present invention are independent of the specific form of air outlet or diffuser employed, a particularly useful application of the invention is made to a panel unit type of diffuser outlet illustrated by way of example in Figure 1. A typical pan 16 having a porous or foraminous central panel 17 constitutes one of a plurality of pans forming an inner wall for the space.

About the periphery of the pan 16 is provided a continuous vertical upstanding flange 18 having a continuous offset bead 19 pressed out therefrom by means of which each pan is assembled to the cross rods 12. In many ceiling units a pad of sound-absorbing material is carried on the inside of each pan 16. In the ventilating system illustrated, spaced apart pans 16 are selected from which the pad is removed thereupon the pan can function as an outlet panel of an air diffuser unit 14. To effect that end, a shell 15 is assembled on the pan 16 and forms together therewith a secondary plenum chamber C adapted to receive air at increased pressure and velocity from a primary plenum chamber C', namely, the duct 13.

The shell 15 is provided with an integral tubular collar or mounting 23. Sustained within the collar 23 is a generally Z-shaped bridge or bracket 25 having an intermediate offset portion 28 which cooperates with a nut member 26 to receive a bolt 27 in threaded assembly.

As is shown in Figure 6, a valve plate 29 carried on the bolt 27 has substantially the same configuration as the inlet aperture 30 formed by the collar 23 so that selective adjustment of the valve plate 29 will regulate the admission of air into the plenum chamber C. To supply air to the various spaced apart outlets in the inner wall, the duct 13 has a corresponding plurality of openings 31. A generally flexible sleeve 32 connects each air diffuser 14 with a corresponding opening 31 even though the openings and the air outlets are not in exact alignment. The sleeve 32 preferably comprises a flexible material which may be rigidified somewhat by means of a resilient spiral coil spring 33.

A second tubular collar or mounting 34 is provided having an annular depending flange 35 engaging in face to face relation with a wall 36 of the duct 13. For sealing and cushioning the engagement between the wall 36 and the flange 35 an annular gasket 37 is positioned therebetween.

One or more resilient retaining clips are carried on the collar 34. Although any suitable number may be employed, excellent results are obtained through the use of three clips, each including a relatively long leg 39 having an intermediate offset and reinforcing portion 40. Connected at one end of the leg 39 is a retaining extension 41 which terminates in a lead-in terminal 42. Connected at the other end of the leg 39 is a looped portion 43 connected to a second resilient looped terminal comprising an abutment or protuberance 44. In order to properly position and interlock the clips with respect to the collar 34, openings 45 are axially or longitudinally staggered at predetermined intervals about the wall of the collar.

According to the present invention, the collar 23 is also provided with one or more spring clips which are indicated generally at 24. In the form of the invention herein illustrated two clips 24 are utilized each consisting of a long leg 50 which overlies the outer peripheral surface portion of the collar 23 and which is particularly characterized by the formation therein of an intermediate lug or projection 51 extending radially outwardly from the collar 23.

At the opposite ends of the long leg 50, there are provided radially inwardly extending angularly offset legs 52 which pass inwardly through the collar 23 and terminate in bent over retaining portions 53.

The spring clips 24 may be staggered with respect to the axis of the collar 23 and lie in circumferentially spaced relation with respect to one another.

By virtue of the provisions thus made, the structure of the apparatus described can be readily assembled.

First of all, the collar 34 and the flexible tube 32 may be connected together as a first subassembly. Thus, the clips 38 are assembled on the collar 34 whereupon the collar 34 is "threaded" into one end of the flexible tube 32. The helically wound spring 33 will be bulged outwardly and the flexible material comprising the walls of the flexible tube 32 will also be bulged outwardly as indicated at 32a in Figure 4. Thus, the collar 34 and the tube 33 will be placed in firm assembly with one another.

The collar 23 having been equipped with the spring clips 24, the other end of the flexible tube 32 can then be "threaded" into assembly with the air diffuser or air outlet 14. The tube 32 is centered with respect to the collar 23 whereupon the end of the tube is engaged and threaded progressively over the axially or longitudinally staggered and circumferentially spaced spring clip members 24. By following such procedure, the resilient abutments provided by the lugs 51 on the spring clips 50 continually flex the fiber of the tube 32 between the spaced coils of the spring 33 until the tube 32 is fully engaged upon the collar 23. Thus, the resilient abutments 51 bulge portions of the tube 32, as indicated at 32b in Figure 4.

In both of the assembling steps, it will be appreciated that the coils of the spring 33 will be disposed on axially or longitudinally opposite sides of the abutments provided by the spring clips 50 and by the portions 44 of the clips 38. Thus, the loops of the spring 33 act as stops and help to maintain the tube 32 in assembly with the collars 34 and 23.

It will be further appreciated that the assembly of the collar 34 to the tube 32 or the assembly of the collar 23 of the air diffuser unit 14 to the tube 32 may be interchanged in order, if desired.

When the tube 32 is assembled to the collar 34 and also to the air diffuser outlet 14, an air distributor outlet unit is thus provided which may be easily and conveniently snapped in place in assembly with the main duct 13. In this connection, it will be noted that each of the looped ends 43 of the clips 38 engage the collar 34 with each of the clip free edges 46 snapping into interlocked detachable engagement in one of the longitudinally staggered openings 45.

In assembling the air distributor unit to the duct 13, the clips 38 are centered with respect to each corresponding opening 31 and the lead-in terminals 42 of the clips are engaged with the edges of the opening 31 so that a slight upward pressure applied to the clips will flex the terminal 42 radially inwardly and the finger extensions 41 snap into detachable engagement with the wall 36.

To complete the assembly of the unit, the shell 15 is placed in a corresponding pan 16 and the pan 16 is snapped into place, thereby closing the opening in the inner wall and completing the assembly of the air distributor outlet.

In final assembly, the pan 16 not only functions as an air distributor outlet panel for the ventilating system but also forms a part of the finished interior surface of the inner wall exposed to the interior of the space being ventilated.

The instant coupling or collar and tube construction has been found highly advantageous since cement is no longer necessary to maintain the elements in assembly. Furthermore, by utilizing detachable clips, assembly and break-down of the subassembly with the duct 13 may be facilitated.

Although various minor structural modifications might be suggested by those versed in the art, it should be understood that we wish to embody within the scope of the patent warranted hereon all such modifications as reasonably and properly come within the scope of our contribution to the art.

We claim as our invention:

1. In combination, a flexible tubular duct having a helically wound reinforcing means in the wall thereof, a collar having an annular wall of a diameter adapted to be received in one end of said duct, a bracket inside of said collar, and a fastening staple including a long leg overlying the outer surface of said annular wall of said collar characterized by an intermediate lug extending radially outwardly thereof, said staple further including inwardly extending angularly offset legs on opposite ends of said long leg and passing inwardly through said annular wall of said collar and through said bracket, the ends of said offset legs being bent over to restrain said bracket in firm assembly with said collar, said intermediate lug of said long leg of said staple forming a radially outwardly projecting protuberance engaging said sleeve in threaded relation with said helically wound reinforcing means to keep said duct in assembly with said collar.

2. In ventilating apparatus, a flexible tubular duct having a helically wound reinforcing means in the wall thereof, a collar having an annular wall received in one end of said duct, a valve means including a support bracket inside of said collar and adapted to control the flow of air through said duct, and fastening means extending through said collar and said bracket including a spring clip having a long leg overlying the outer surface of said collar and characterized by an intermediate lug portion extending radially outwardly, said spring clip further including inwardly extending angularly offset legs on opposite ends of said long leg passing inwardly through said collar and through said support bracket for retaining said support bracket in firm assembly within said collar, said intermediate lug portion forming a radially outwardly projecting protuberance engaging said sleeve in threaded relation with said helically wound reinforcing means to keep said duct in assembly with said collar.

3. In a fastening means for ventilating apparatus, a flexible tubular sleeve having a helically wound spiral reinforcing spring disposed peripherally thereof, collar means for effecting a connection with one end of said sleeve and adapted to carry valving structure to control the flow of air through the sleeve, said collar means having a diameter approximately equal to the diameter of the sleeve and the diameter of the coils of the spring, and a plurality of circumferentially spaced protuberances projecting radially outwardly of said collar and engaging said sleeve in threaded relation with said spring, said protuberances bulging portions of said sleeve between axially adjacent coils of the spring, each said protuberance comprising a spring clip having a long leg overlying the outer surface of the collar and characterized by an intermediate lug portion extending radially outwardly, each said spring clip having inwardly extending angularly offset legs on opposite ends of said long leg passing inwardly through said collar and being bent over to form retainer portions adapted to engage and retain the valving means in assembly inside of the collar means.

References Cited in the file of this patent
UNITED STATES PATENTS

| 2,523,770 | Marette | Sept. 26, 1950 |
| 2,550,810 | Heidbrink | May 1, 1951 |
| 2,701,998 | Wulle | Feb. 15, 1955 |

FOREIGN PATENTS

| 570,815 | Great Britain | July 24, 1945 |